(12) United States Patent
Yu

(10) Patent No.: US 6,807,572 B1
(45) Date of Patent: Oct. 19, 2004

(54) ACCESSING NETWORK DATABASES

(75) Inventor: Zhi Z. Yu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 726 days.

(21) Appl. No.: 09/652,691

(22) Filed: Aug. 31, 2000

(51) Int. Cl.$^7$ .............................................. G06F 13/00
(52) U.S. Cl. ........................ 709/219; 709/203; 709/217; 709/224
(58) Field of Search ................................. 709/200, 201, 709/203, 217, 218, 219, 226, 227, 224

(56) References Cited

U.S. PATENT DOCUMENTS

| | | | | |
|---|---|---|---|---|
| 5,778,372 | A | * | 7/1998 | Cordell et al. ............... 707/100 |
| 6,138,120 | A | * | 10/2000 | Gongwer et al. ............. 707/10 |
| 6,212,565 | B1 | * | 4/2001 | Gupta .......................... 709/229 |
| 6,282,652 | B1 | * | 8/2001 | Scheifler ..................... 713/200 |
| 6,338,089 | B1 | * | 1/2002 | Quinlan et al. ............. 709/227 |
| 6,389,462 | B1 | * | 5/2002 | Cohen et al. ................ 709/218 |
| 6,427,161 | B1 | * | 7/2002 | Livecchi ...................... 709/102 |
| 6,434,543 | B1 | * | 8/2002 | Goldberg et al. ............... 707/2 |
| 6,438,597 | B1 | * | 8/2002 | Mosberger et al. ......... 709/227 |
| 6,457,054 | B1 | * | 9/2002 | Bakshi ........................ 709/227 |
| 6,606,645 | B1 | * | 8/2003 | Cohen et al. ................ 709/203 |

OTHER PUBLICATIONS

"Tuxedomain the independent information hubs for leading middleware professionals from middleAware—not middleware—dot com TUXEDO's FAQ", Hegetor Ltd., 1998.

"MTSense the independent information hub for Microsoft MTS/DCOM professionals from middleAware—not middleware—dot com COM Bites, MTS Flags", Hegetor Ltd, 1998.

"Microsoft Transaction Service—Transactional Component Services, A guide to Reviewiing Microsoft Transaction Server Release 2.0—The Best Technology for Developing and Deploying Applications on Windows NT", Microsoft Corporation, 2000.

* cited by examiner

Primary Examiner—Moustafa M. Meky
(74) Attorney, Agent, or Firm—Trop, Pruner & Hu, P.C.

(57) ABSTRACT

A client may use a hypertext transfer protocol to make requests for information stored for the client on a relational database management server. The load on the server may be reduced and the ability to quickly access information may be enhanced by using an application server that maintains connections and sessions for certain types of queries to the relational database management server. In particular, connections and sessions for commonly repeated queries may be maintained on the application server in an always active state so that such information may be readily obtained without establishing a new connection and a new session.

21 Claims, 3 Drawing Sheets

ACCESSING NETWORK DATABASES

BACKGROUND

This invention relates generally to accessing relational databases on networks to provide cached information to a client browser.

Increasingly, data is cached on a server and accessed by clients over the Internet. This decreases the resource requirements on the client while providing ready access to the information with a sufficiently high speed Internet connection. Conventionally, when the client needs information (such as the address of a web site that has been bookmarked), the browser resident on the client formulates a request and transmits it over the Internet to a hypertext transfer protocol (HTTP) server. The server then transmits the request to a relational database management server over a common gateway interface (CGI) program. Each time the relational database management server is accessed, a new connection and a new session to that server must be established.

Referring to FIG. 3, the establishment of such a connection and a session is somewhat time consuming and needlessly bogs down the processing of the relational database management server. The request from the browser must be decoded as indicated in block 48. Then, a Structured Query Language (SQL) query must be parsed from other information such as the HTTP server's uniform resource locator (URL) (block 50). The relational database management server then must bind the program variables as indicated in block 52. The relational database management server executes the query as indicated in block,54. Thereafter, the relational database management server must fetch the results as indicated in block 56.

Generally, access by the browser is stateless. The term "stateless" refers to a process that participates in an activity without monitoring all the details of its state and particularly is not aware of the context of a given process. Because of the stateless character of the browser's request, it is difficult to maintain any type of caching mechanism on the server side.

Therefore, there is a need for a more efficient way to handle stateless accesses to a relational database management server from an Internet browser.

DETAILED DESCRIPTION

Figure 1:
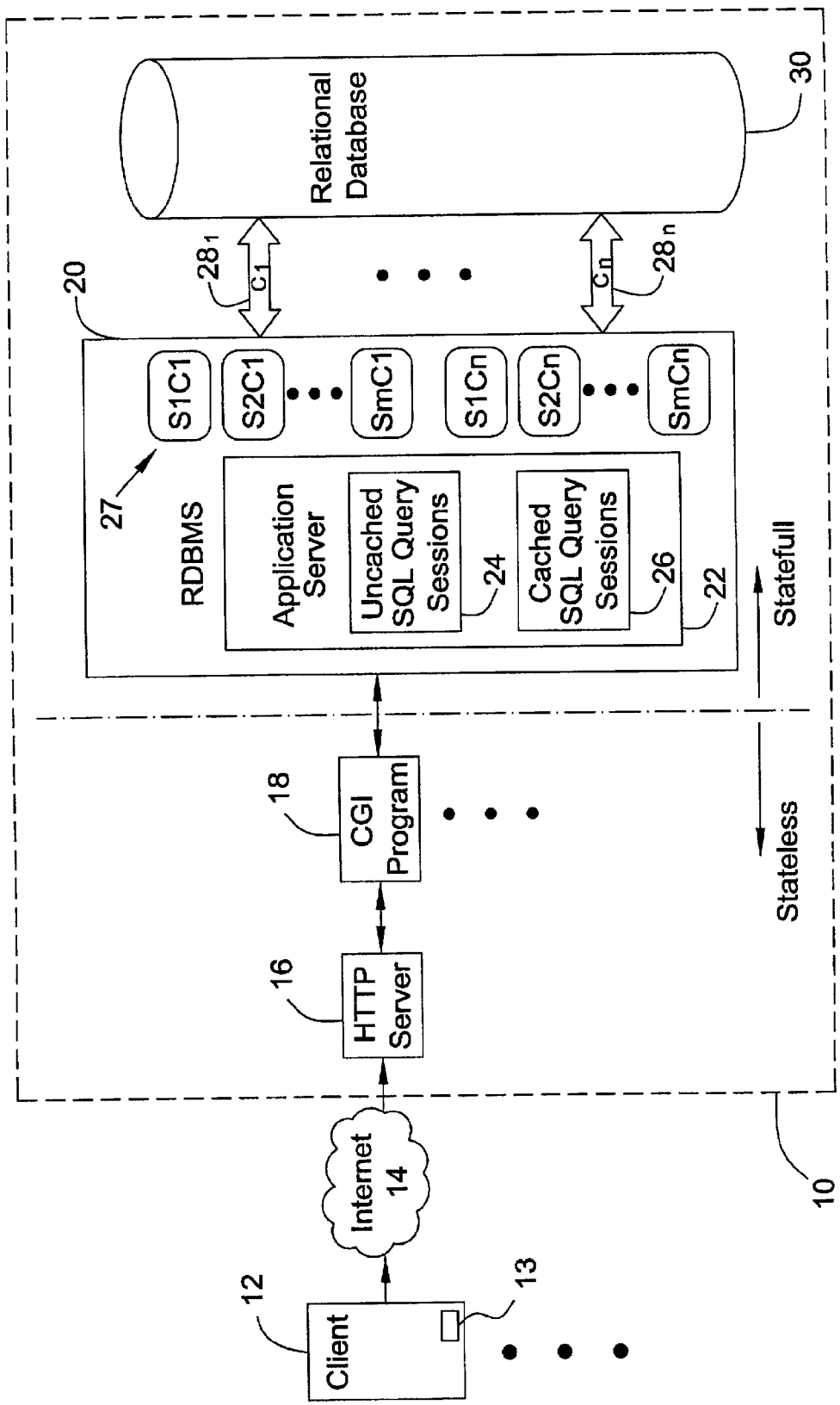
FIG. 1 is a schematic depiction of one embodiment of the present invention.

Referring to FIG. 1, a client 12 is a processor-based system with a connection to the Internet 14. The client 12 includes an Internet browser 13 having a software application that interfaces between the client 12 and the Internet 14. The client 12 may be a desk top computer or processor-based appliance such as a cellular telephone, as two examples.

In some embodiments of the present invention, the client 12 may cache a large amount of information on the relational database management server 20. This data caching frees the client 12 resources from being tied up by storing a large amount of data on the client 12. The client 12 may cache specific information such as a user profile, personal information manager (PIM) information such as a calendar or an electronic mail address book, and uniform resource locator (URL) bookmarks for commonly accessed Internet web sites.

When the user wishes to access such cached data, the browser 13 formulates a stateless request. The request is transmitted over the Internet 14 to a hypertext transfer protocol (HTTP) server 16 also known as a web server. The HTTP server 16 handles the request in a stateless fashion. The HTTP server 16 forwards the request over a common gateway interface (CGI) program 18 to relational database management server 20.

In the processor-based system 10, the request is transformed into a stateful request. A stateful request takes into account its content. In one embodiment of the present invention, an application server 22 acts as middleware between the HTTP server 16 and the relational database management server (RDBMS) 20. The application server 20 facilitates access to commonly utilized information by maintaining caches that contain connections and sessions 27 to access commonly requested information. When information is repeatedly requested, a cached SQL query session 26 may be stored in association with the application server 22. Such commonly requested information may be the subject of a persistent connection 28 between the relational database management server 20 and a relational database 30. Thus, a persistent connection 28 and an active session/connection association 27 may be maintained for accessing such information.

Figure 3:
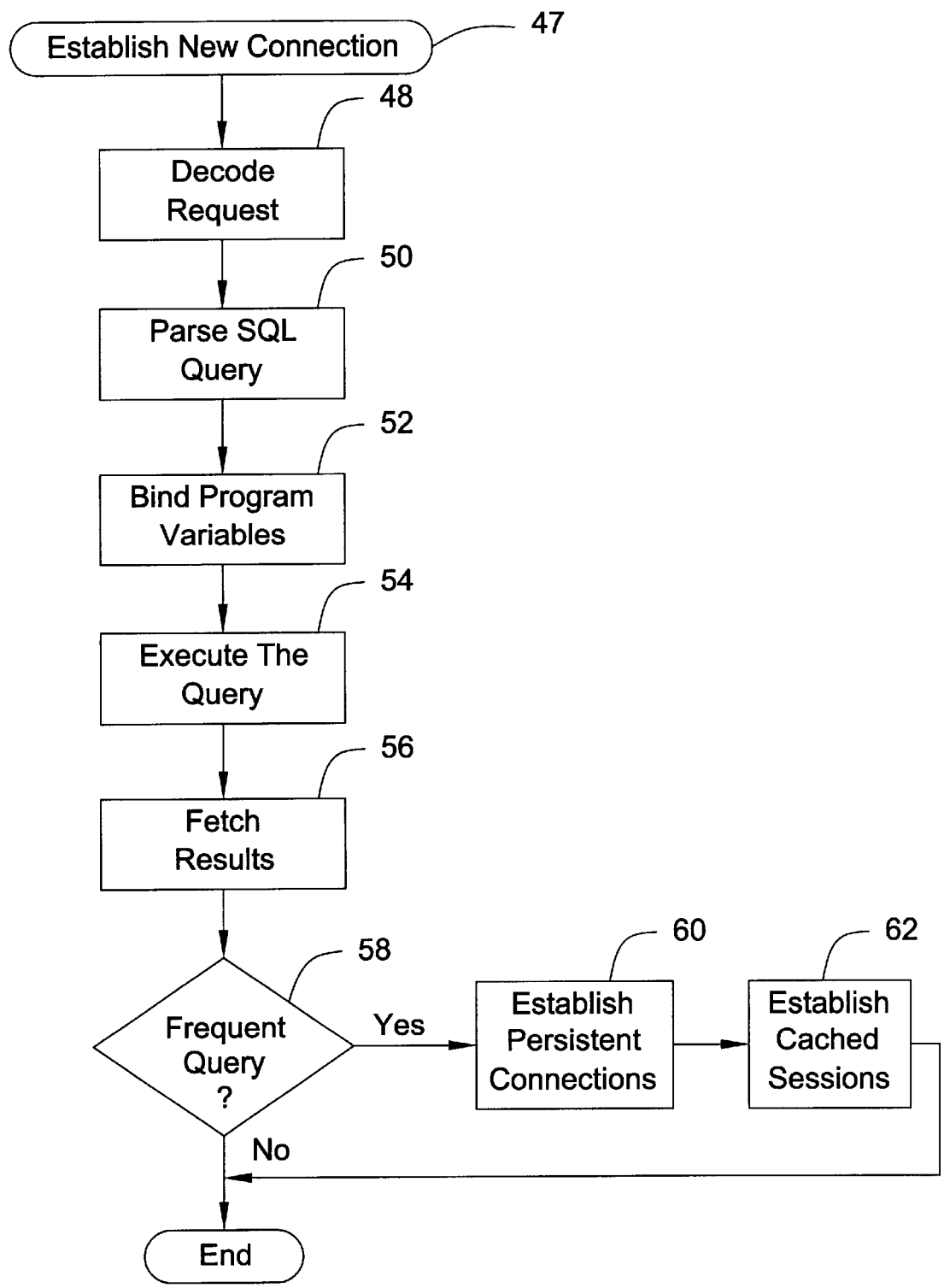
FIG. 3 is a flow chart for accessing a relational database from an Internet browser in accordance with one embodiment of the present invention.

As a result, it is not necessary to undergo the extensive procedures shown in FIG. 3 for establishing a connection from the browser 13 to the relational database 30 for common, often repeated, database 30 queries. The application server 22 need only re-execute and fetch queries using its cached SQL query sessions 26 when those queries correspond to one of the commonly requested, cached SQL query sessions 26.

As a result, the application server 22 may reduce the expansive database opening overhead. It may also substantially reduce the overhead associated with SQL parsing, and variable bindings. For most query requests on behalf of multiple clients, the application server 20 need only re-execute and fetch the queries from its cached SQL query sessions 26. For less frequent queries, the application server 12 can choose to open a new connection 28 or a new session 24 to service the request. Depending on the frequencies of such requests and the load of other, more frequent queries, the application server 22 can prioritize the types of requests, choosing to give resources to other queries first. Thus, the application server 22 may have the flexibility and scalability to serve potentially large numbers of clients 12 during system configuration time as well as during run time.

When receiving a query through the CGI program 18, the application server 22 tries to find an existing session containing a reference to that query for execution. Under this architecture, the application server 22 caches the sessions associated with frequent queries and is therefore ready to execute upon request from a client 12. The sessions may be grouped to share a fixed number of database connections that are pre-opened. If the request traffic increases dramatically, the application server 22 can dynamically open more database connections and sessions to balance the extra load.

By creating and intelligently maintaining a pool of connections and sessions 26 for frequently repeated requests, high performance and optimized data access may be achieved in some embodiments of the present invention. At the same time, the system 10 satisfies the requirement of stateless data access by multiple clients 12 using hypertext transfer protocols. The application server 20 converts the stateless request from the HTTP server 16 into a stateful request for intelligently accessing the relationship database 30.

Figure 2:
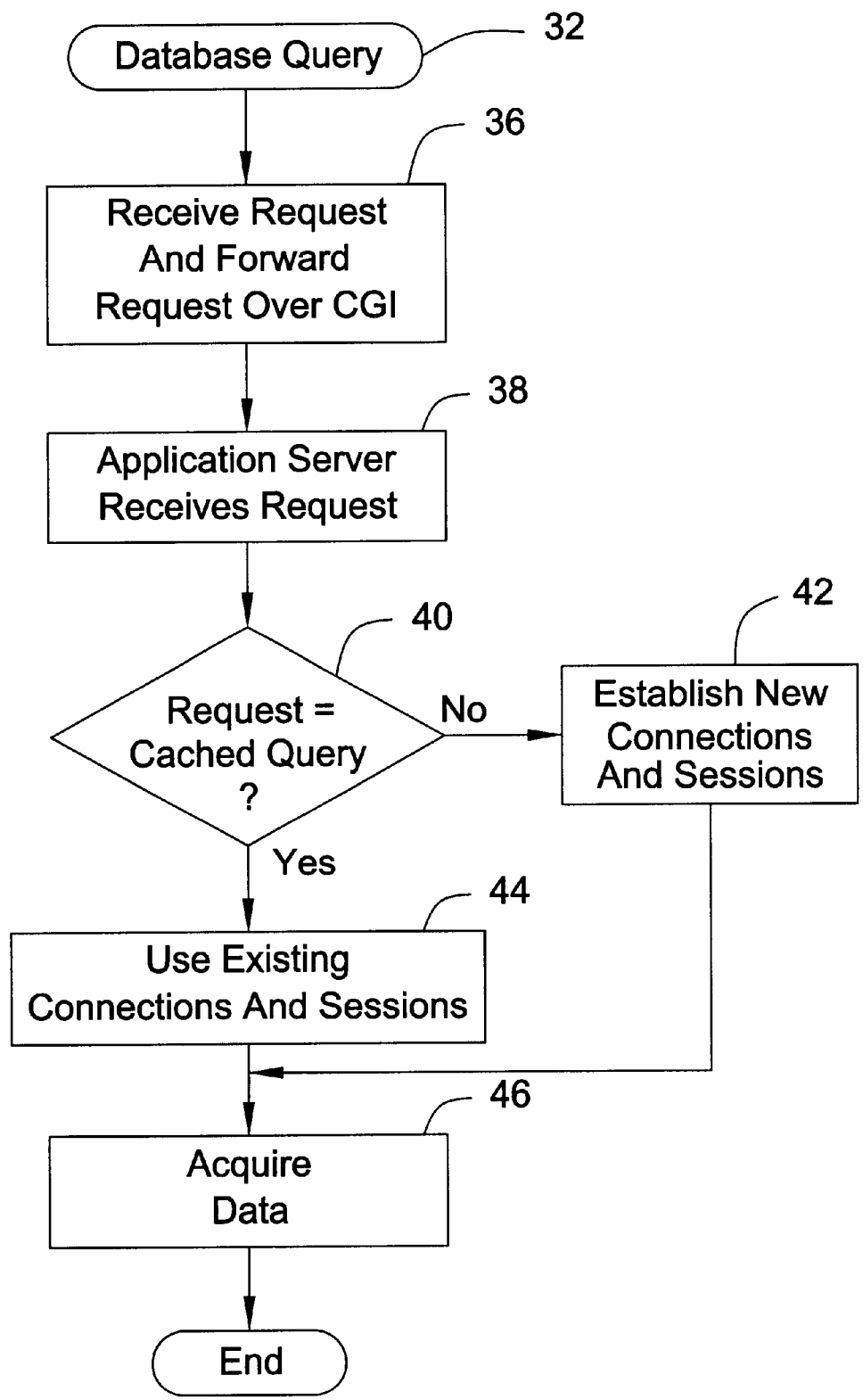
FIG. 2 is a flow chart for software for implementing the embodiment shown in FIG. 1.

Turning next to FIG. 2, the database query software 32, in accordance with one embodiment of the present invention, begins by receiving an HTTP format request from a client 12 and forwarding that request over a common gateway interface program 18, as indicated in block 36. The application server 22 then receives the request as indicated in block 38. The application server 22 attempts to relate the current request to a pre-cached request responding to an already open connection from the relational database management server 20 to the database 30 (diamond 40).

If such a correlation can be established, for example because it is a request that is made frequently by any client 12, a persistent connection and session 27 may be utilized (block 44) to access the information from the relational database 30.

If the request is not one which is frequently made or which has not been the subject of a cached SQL query session 26, it is treated as an un-cached SQL query session 24. As a result, a new connection 28 must be established as indicated in block 42. The software 47 for completing the establishment of a new connection is shown in FIG. 3.

After the new connection is established (FIG. 3, block 56), a check at diamond 58 determines if the request is a frequent query. A count may be maintained for each request. When the count exceeds a predetermined number, for a given client 12, a persistent connection may be established as indicated in block 60. A cached SQL query session 26 is also established (block 62).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
  receiving, at a server, a hypertext transfer protocol request from a client for data;
  maintaining connections and sessions to a database for a query;
  determining at said server whether query content of said request corresponds to query content of said query; and
  using said connections and sessions to access said database if the query content of said request corresponds to the query content of said query.

2. The method of claim 1 wherein receiving includes receiving at a hypertext transfer protocol server said hypertext transfer protocol request from the client for the data.

3. The method of claim 2 wherein maintaining the connections and sessions to the database includes maintaining connections and sessions to the database through the server coupled to said hypertext transfer protocol server.

4. The method of claim 3 including coupling the hypertext transfer protocol request received by said hypertext transfer protocol server to said server through a common gateway interface program.

5. The method of claim 1 further including determining a number of times a given request is made and when the number of times exceeds a predetermined number, maintaining connections and sessions to the database to service said given request.

6. The method of claim 1 further including accessing a relational database using a relational database management server.

7. The method of claim 6 including using middleware to determine whether the query content of said request corresponds to the query content of said query.

8. An article comprising a medium storing instructions that if executed enable a system to:
  receive a hypertext transfer protocol request from a client for data;
  maintain connections and sessions to a database for a query;
  determine whether query content of said request corresponds to query content of said query; and
  use the connections and sessions to access said database if the query content of said request corresponds to query content of said query.

9. The article of claim 8 further storing instructions that if executed enable the system to determine a number of times a given request is made.

10. The article of claim 9 further comprising instructions that if executed enable the system to determine if the number of times exceeds a predetermined number and maintain connections and sessions to the database to service said given request if said predetermined number is exceeded.

11. The article of claim 8 further comprising instructions that if executed enable the system to access a relational database using a relational database management server.

12. The article of claim 11 further comprising instructions that if executed enable the system to use middleware to determine whether the query content of said request corresponds to the query content of said query.

13. A server comprising:
  a link to a common gateway interface program;
  a plurality of connections and sessions from said server to enable data to be accessed from a relational database, some of said connections and sessions being persistent connections and persistent sessions; and
  a storage to store content information about frequent requests for data from said relational database, said server having persistent connections and sessions to service said frequent requests.

14. The server of claim 13 wherein said server is a relational database management server and said server includes middleware to correlate a request to said server with at least one of the persistent connections and sessions from said server to said database.

15. The server of claim 13 further comprising a cache to store sessions for said frequent requests.

16. The system of claim 13, further comprising a cache to store user information of a client on the server.

17. A method comprising:
  receiving, at a server, a query from a client for information in a database;
  determining whether the query corresponds to a cached query session; and accessing the database using a persistent connection if the query corresponds to the cached query session.

18. The method of claim 17, wherein the cached query session is stored in a query cache in the server.

19. The method of claim 18, further comprising maintaining an association between the cached query session and the persistent connection.

20. The method of claim 18, further comprising storing a query session in the query cache if the query session is repeatedly requested.

21. The method of claim 19, further comprising storing user information of a user of the client on the server.

* * * * *